(12) United States Patent
Kiyota

(10) Patent No.: US 8,695,199 B2
(45) Date of Patent: Apr. 15, 2014

(54) MANUFACTURING METHOD OF AN IMAGE SENSOR UNIT

(75) Inventor: Hideo Kiyota, Seta-gun (JP)

(73) Assignee: Canon Components, Inc., Saitama-ken (JP)

( * ) Notice: Subject to any disclaimer, the term of this patent is extended or adjusted under 35 U.S.C. 154(b) by 92 days.

(21) Appl. No.: 13/210,424

(22) Filed: Aug. 16, 2011

(65) Prior Publication Data

US 2011/0297304 A1  Dec. 8, 2011

Related U.S. Application Data

(60) Division of application No. 12/102,431, filed on Apr. 14, 2008, now abandoned, which is a continuation of application No. PCT/JP2007/059903, filed on May 14, 2007.

(51) Int. Cl.
*B21D 39/00* (2006.01)

(52) U.S. Cl.
USPC .............................. 29/509; 438/64

(58) Field of Classification Search
USPC ......... 29/446, 447, 505, 509, 513; 250/208.1; 257/432, 433, 434, 678, 727; 358/482, 358/483, 512–514; 361/729, 747; 438/25, 438/26, 64–67, 124, 125, 126, 127
See application file for complete search history.

(56) References Cited

U.S. PATENT DOCUMENTS

| | | | |
|---|---|---|---|
| 5,581,076 A | 12/1996 | Tabata | |
| 6,233,103 B1 * | 5/2001 | Ikeda | 359/819 |
| 6,241,836 B1 | 6/2001 | Skirha et al. | |
| 6,587,231 B1 * | 7/2003 | Sung | 358/497 |
| 6,667,882 B2 * | 12/2003 | Pauser | 361/695 |
| 7,352,402 B2 * | 4/2008 | Fujimoto et al. | 348/340 |

FOREIGN PATENT DOCUMENTS

| | | | |
|---|---|---|---|
| JP | 06-125423 A | 5/1994 |
| JP | 07-162587 A | 6/1995 |
| JP | 2000-180685 A | 6/2000 |
| JP | 2001-018295 A | 1/2001 |
| JP | 2001-069307 A | 3/2001 |
| JP | 2003-222774 A | 8/2003 |
| JP | 2005-031487 A | 2/2005 |
| JP | 2006-287923 A | 10/2006 |
| JP | 2007-001116 A | 1/2007 |
| TW | 233132 B | 5/2005 |
| TW | 236026 B | 7/2005 |

OTHER PUBLICATIONS

Taiwanese Official Notification of Allowance dated Dec. 28, 2010, in corresponding Taiwanese Patent Appln. No. 097117021.

* cited by examiner

*Primary Examiner* — Lee D Wilson
*Assistant Examiner* — Steven A Maynard
(74) *Attorney, Agent, or Firm* — Fitzpatrick, Cella, Harper & Scinto

(57) ABSTRACT

A method of manufacturing a molding product of an image sensor unit having a molded product with a substantially rectangular parallelpiped outer shape and incorporating a substrate on which photoelectric conversion elements are arranged in line, includes the steps of forming a frame on the molded product to surround a periphery of the substrate, forming a plurality of caulking projections substantially linearly arranged on an upper surface of the frame in a longitudinal direction, with each caulking projection having a proximal portion extending from the frame, and forming a plurality of antiwarping grooves, with each groove being proximate to one of the caulking projections but spaced apart from its respective proximal portion. Additional steps include fitting the substrate to be fixed in the frame of the molded product, and bending the caulking projections by heat and pressure to fix the substrate in the frame.

10 Claims, 16 Drawing Sheets

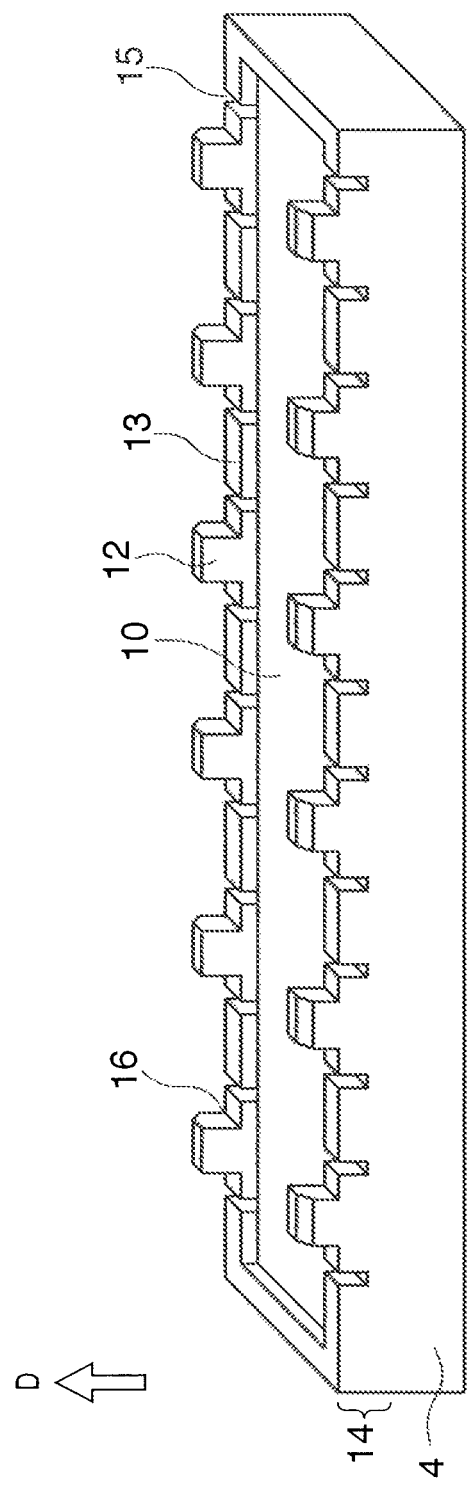

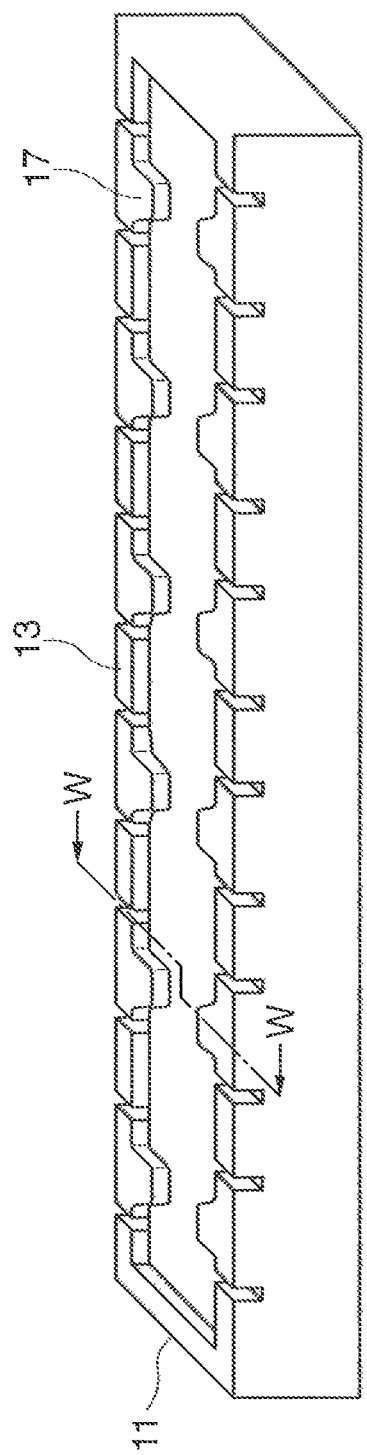

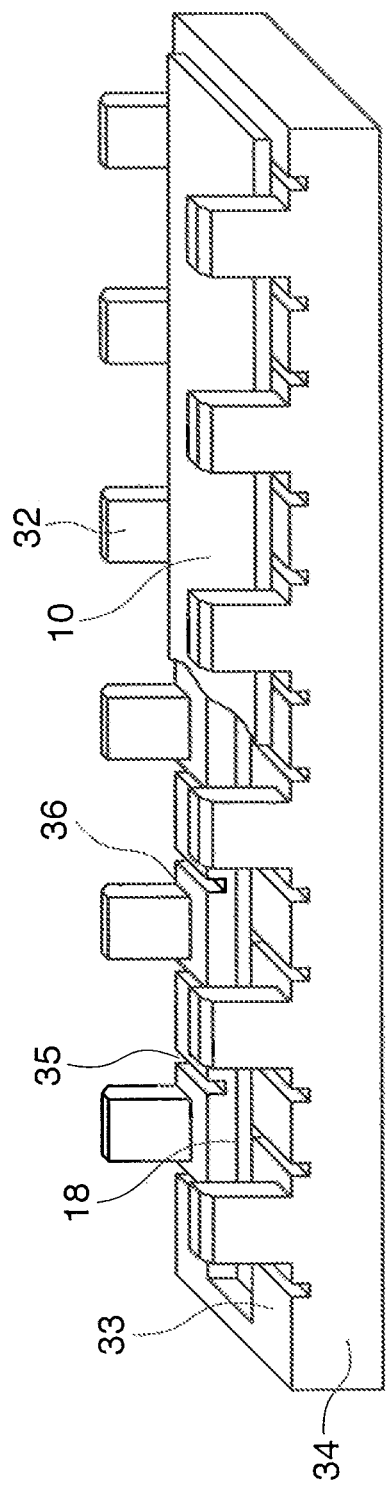

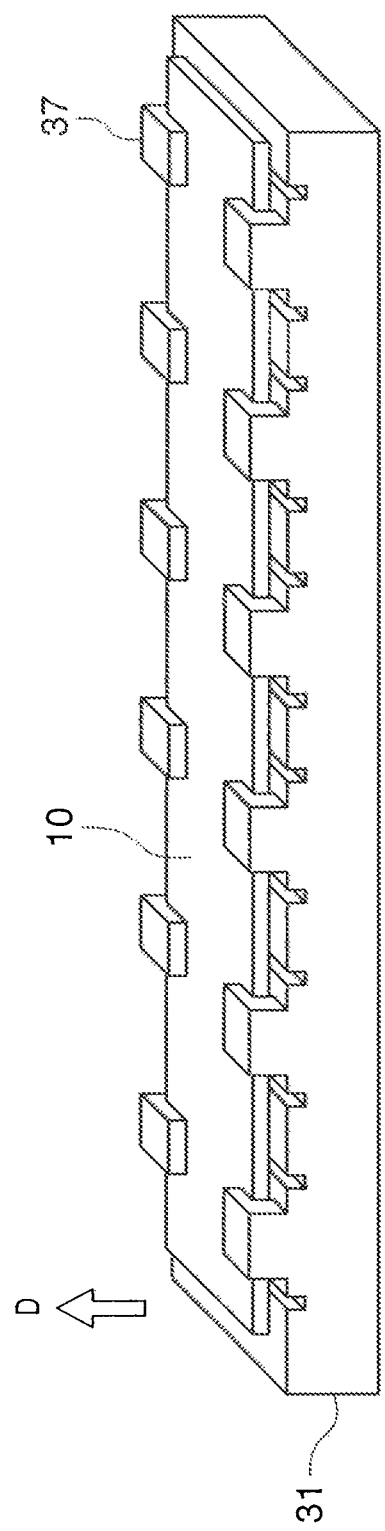

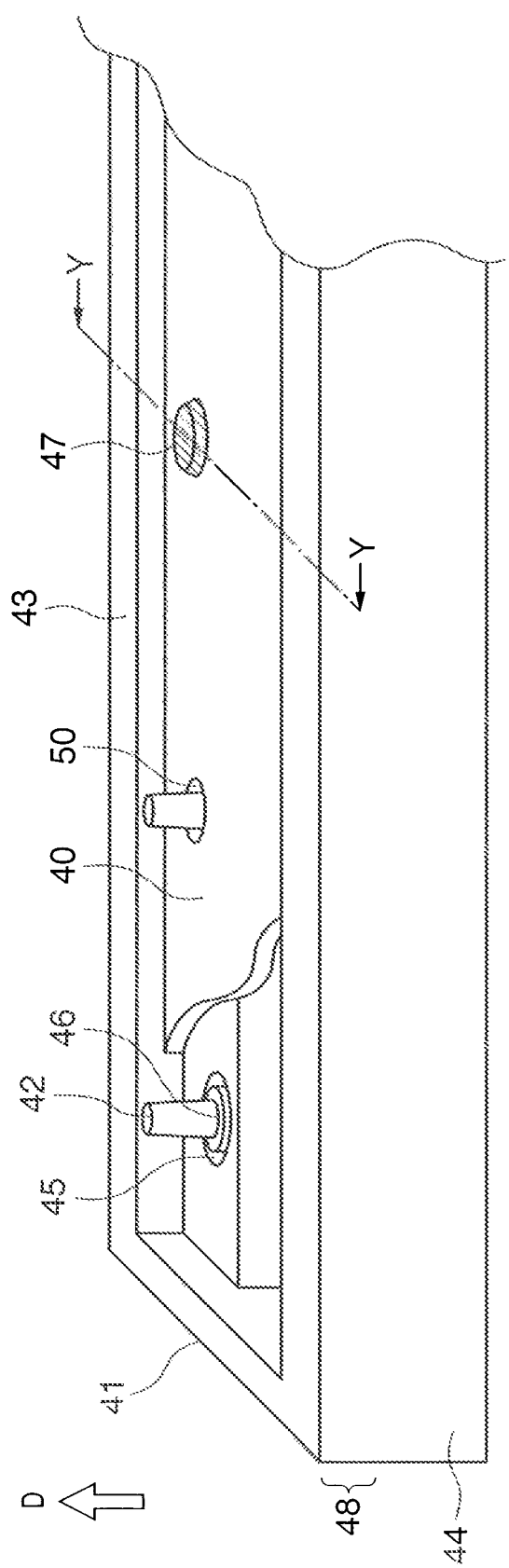

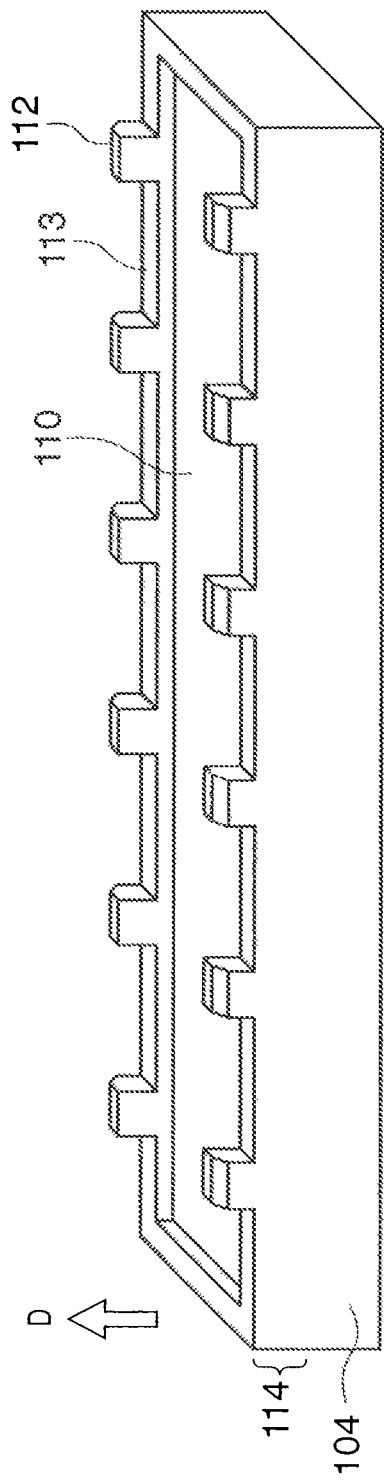

MANUFACTURING METHOD OF AN IMAGE SENSOR UNIT

This application is a divisional of application Ser. No. 12/102,431, filed on Apr. 14, 2008, which is a continuation of PCT/JP2007/059903, filed May 14, 2007.

TECHNICAL FIELD

The present invention relates to a thermally caulked combined structure obtained by combining an object to be fixed to a molded product made of a thermoplastic resin by deforming caulking projections formed on the surface of the molded product by heat and pressure, a method of thermal caulking, an image sensor using the thermally caulked combined structure, and an image reading apparatus using the image sensor.

BACKGROUND ART

Image reading apparatuses such as an image scanner and copying machine use an image sensor that optically reads image information of an original and converts the information into an electrical signal. A general image sensor is a contact image sensor unit (to be referred to as a CIS unit hereinafter) that has a linear shape and reads an original at a close distance without changing the size (patent reference 1).

FIG. 10 depicts a view for explaining the structure of the conventional CIS unit by its section.

A CIS unit 100 reads an image of an original 102 placed below a transparent glass plate 103. The unit 100 has, inside a molded product 104, a linear light source 105 that illuminates the surface of the original 102, and a lens array 107 that forms an image of the reflected light from the original surface on a linear photoelectric conversion element 108. The unit 100 further includes, for example, a rectangular substrate 110 on which the linear photoelectric conversion element 108 and a driver and controller of the photoelectric conversion element 108 are mounted. The molded product 104 is made of a thermoplastic resin from the viewpoints of molding properties and economy (patent reference 2).

In this CIS unit, a read line 109 on the original 102 illuminated with the linear light source 105, the lens array 107, and the photoelectric conversion element 108 are accurately positioned on the same optical axis. Also, the optical distances between these components are determined, and their positions and distances must be accurately maintained. As demands for high-resolution in image reading apparatuses increase in recent years, the components of the CIS unit are incorporated into the molded product 104 with higher dimensional accuracy, and a demand has arisen for a CIS unit having higher dimensional accuracy.

The substrate 110 has, for example, a power supply unit (not shown) of the linear light source 105 and a signal input/output unit (not shown), in addition to the photoelectric conversion element 108, and also has various electronic components. In addition, conductor wirings that connect these parts are formed by patterning, and circuits that drive the photoelectric conversion element 108 and linear light source 105 in accordance with external power supply and signal supply are also formed.

FIGS. 9A and 9B depict views for explaining a method of fixing this substrate to the molded product.

As shown in FIG. 9A, the substrate 110 is fixed by thermal caulking to the molded product 104 made of a thermoplastic resin. In this case, the substrate 110 is thermally caulked to the molded product 104 by a plurality of caulking projections 112 projecting from the upper surface of the molded product 104, thereby forming a thermally caulked combined structure 101 (FIG. 9B) as the CIS unit 100 (FIG. 10). The thermally caulked combined structure 101 functions as the CIS unit 100 shown in FIG. 10 described above. Patent reference 3 describes details of the thermal caulking method that fixes a part as an object to be fixed by caulking by using the caulking projections 112 formed on the surface of the molded product 101 made of a thermoplastic resin.

Patent reference 1: Japanese Patent Laid-Open No. 2006-287923
Patent reference 2: Japanese Patent Laid-Open No. 07-162587
Patent reference 3: Japanese Patent Laid-Open No. 2001-018295

DISCLOSURE OF INVENTION

Problems that the Invention is to Solve

The CIS unit 100 described above is a thermally caulked combined structure obtained by thermally caulking the rectangular, plate-like substrate 110 on the upper surface of the molded product 104 made of a thermoplastic resin and having an almost rectangular parallelepiped outer shape. FIG. 9A shows the state before the substrate 110 is thermally caulked on the molded product 104, and FIG. 9B shows the state after thermal caulking. Note that FIG. 10 shows a section taken along a line A-A' in FIG. 9B. The direction of an arrow D shown in FIG. 9A will be referred to as "upward" hereinafter. Note also that symbol B in FIG. 9B indicates the strain (the amount of warping) generated by this thermal caulking in the longitudinal direction of the thermally caulked combined structure 101.

Referring to FIG. 9A, a frame 114 is formed in the upper portion of the molded product 104 so as to surround the end faces of the substrate 110, and the caulking projections 112 project from an upper surface 113 of the frame 114. The caulking projections 112 are formed as portions of the molded product 104 made of a thermoplastic resin. The substrate 110 is fixed by deforming the caulking projections 112 as shown in FIG. 10 by heating and pressing them by using a thermal caulking jig 119 (FIG. 10). This thermal caulking also heats the molded product 104 around the formation positions of the caulking projections 112. After that, heat shrinkage occurs in this heated portion, and the shrunk shape is fixed by cooling. As shown in FIG. 9B, therefore, the upper portion of the thermally caulked combined structure 101 where the caulking projections 112 are formed shrinks to cause warping by which the upper surface recesses. Particularly when the caulking projections 112 are arranged in an almost straight line, the warping in the direction of this almost straight line has a large amount of warping because the amounts of heat shrinkage of the individual caulking projections 112 build up.

Heat shrinkage of a molded product made of a thermoplastic resin occurs presumably because the residual stress produced inside the molded product by orientation during molding is released by heating after that, and the heated portion shrinks. In an image reading apparatus incorporating a rectangular parallelepiped CIS unit having this warping, the optical distances from the read line 109 to the photoelectric conversion element 108 in the center and two ends in the longitudinal direction of the photoelectric conversion element 108 are different. That is, this optical distance is longer in the two end portions than in the central portion in the longitudinal direction of the CIS unit. This makes it difficult to obtain any appropriate focal point in the entire line region of the CIS unit, and distorts a read image or decreases the resolution.

It is an object of the present invention to solve the conventional problem described above.

The characteristic feature of the present invention is to provide a thermally caulked combined structure that reduces the amount of warping produced when fixing an object to be fixed to a molded product made of a thermoplastic resin by thermal caulking, a method of thermal caulking, an image sensor unit, and an image reading apparatus.

Means of Solving the Problems

To achieve the above object, a thermally caulked combined structure according to an aspect of the present invention comprises the following arrangement. That is, a thermally caulked combined structure obtained by fixing an object to be fixed by thermal caulking by thermally deforming a plurality of caulking projections formed in a longitudinal direction of a molded product made of a thermoplastic resin and having a rectangular parallelepiped outer shape is characterized in that on a surface of the molded product before thermal caulking, the plurality of caulking projections are almost linearly arranged in the longitudinal direction of the molded product, and an antiwarping groove is formed in a position apart from a proximal portion of each caulking projection.

To achieve the above object, an image sensor unit according to an aspect of the present invention comprises the following arrangement. That is, an image sensor unit is characterized by comprising a thermally caulked combined structure cited in any one of claims 1 to 8 and having a hollow portion in which a substrate as an object to be fixed is fixed, a light source which illuminates an original surface, a lens array which forms an image of reflected from the original surface, and a photoelectric conversion element which converts light from the lens array into an electrical signal.

To achieve the above object, an image reading apparatus according to an aspect of the present invention comprises the following arrangement. That is, an image reading apparatus is characterized by comprising an image sensor unit cited in claim 9.

Effects of the Invention

The present invention can reduce the amount of warping produced in a thermally caulked combined structure obtained by thermally caulking a molded product made of a thermoplastic resin and an object to be fixed.

BRIEF DESCRIPTION OF DRAWINGS

FIGS. 1A and 1B depict views for explaining the way a substrate is fixed to a molded product by thermal caulking according to a first embodiment;

FIGS. 5A and 5B depict views for explaining the state in which a substrate is fixed to a molded product by thermal caulking according to a third embodiment;

FIG. 6 depicts a view for explaining a thermally caulked combined structure according to a fourth embodiment;

FIGS. 9A and 9B depict perspective views for explaining a thermally caulked combined structure including a molded product made of a thermoplastic resin and a substrate according to prior art;

BEST MODE FOR CARRYING OUT THE INVENTION

Preferred embodiments of the present invention will be explained in detail below with reference to the accompanying drawings. Note that the following embodiments are not intended to limit the present invention according to the scope of claims, and that not all combinations of features explained in the embodiments are essential to the solving means of the present invention.

Figure 2:
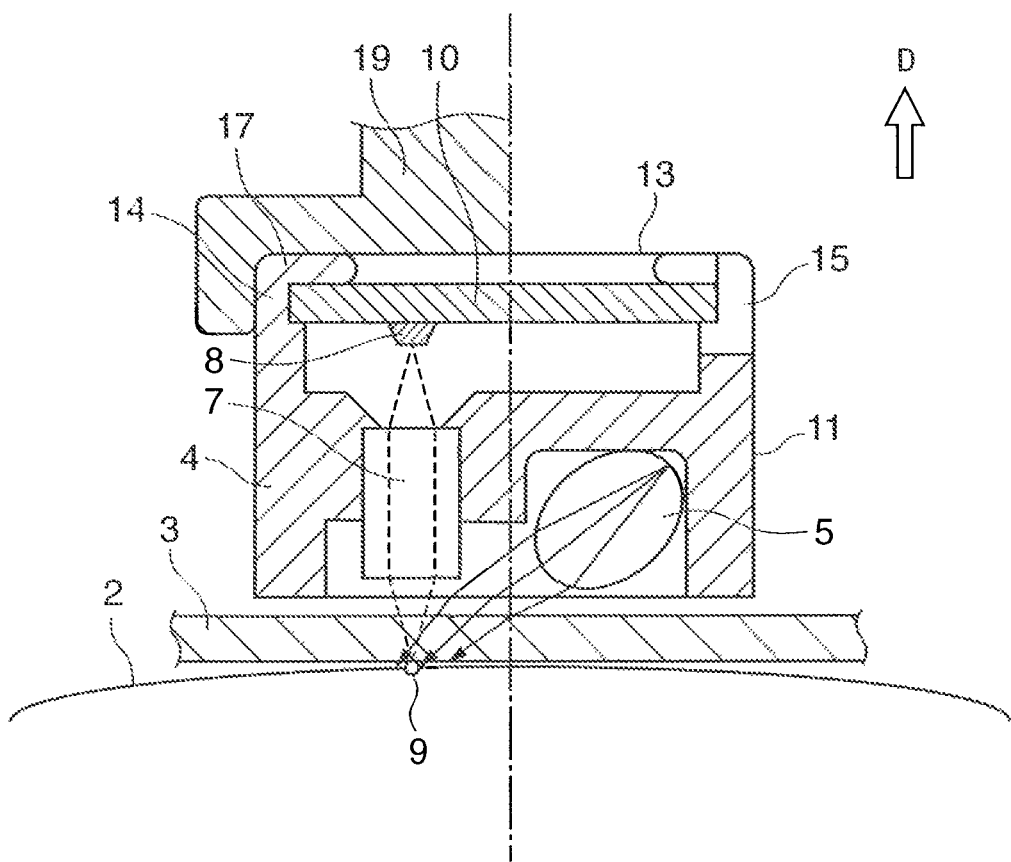
FIG. 2 depicts a view for explaining the structure of a CIS unit according to the first embodiment by its section.
Figure 4:
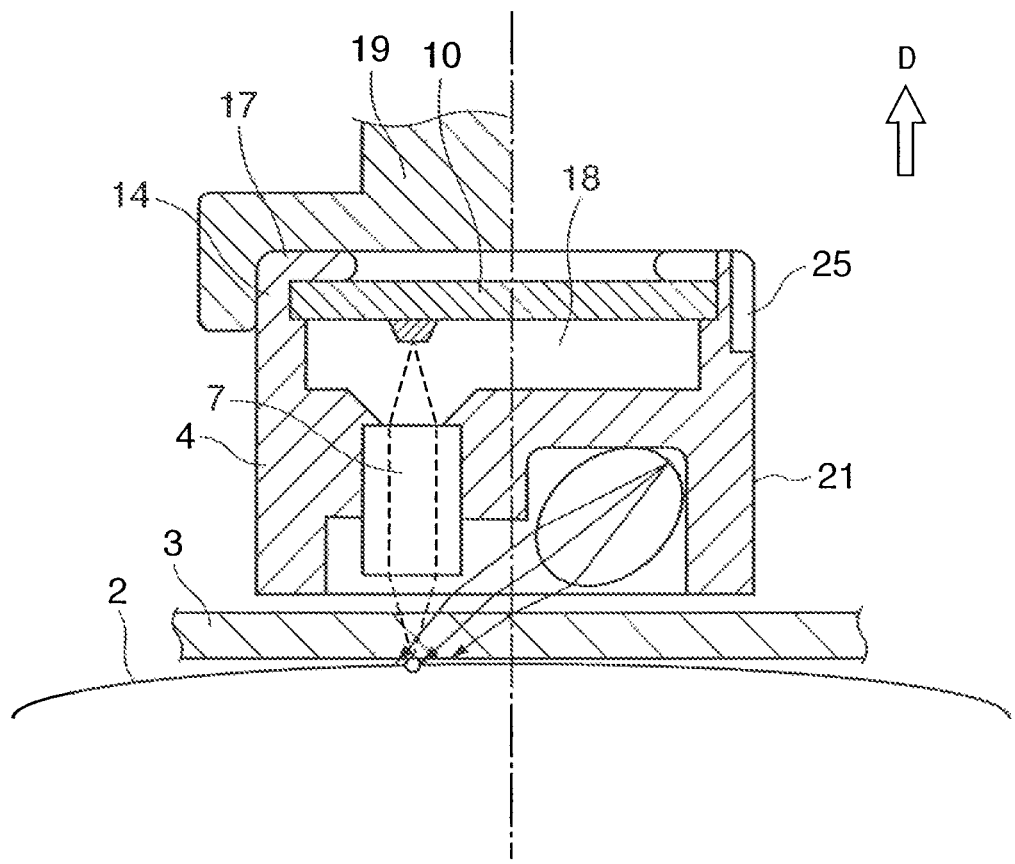
FIG. 4 depicts a view for explaining the structure of a CIS unit according to the second embodiment by its section.
Figure 7:
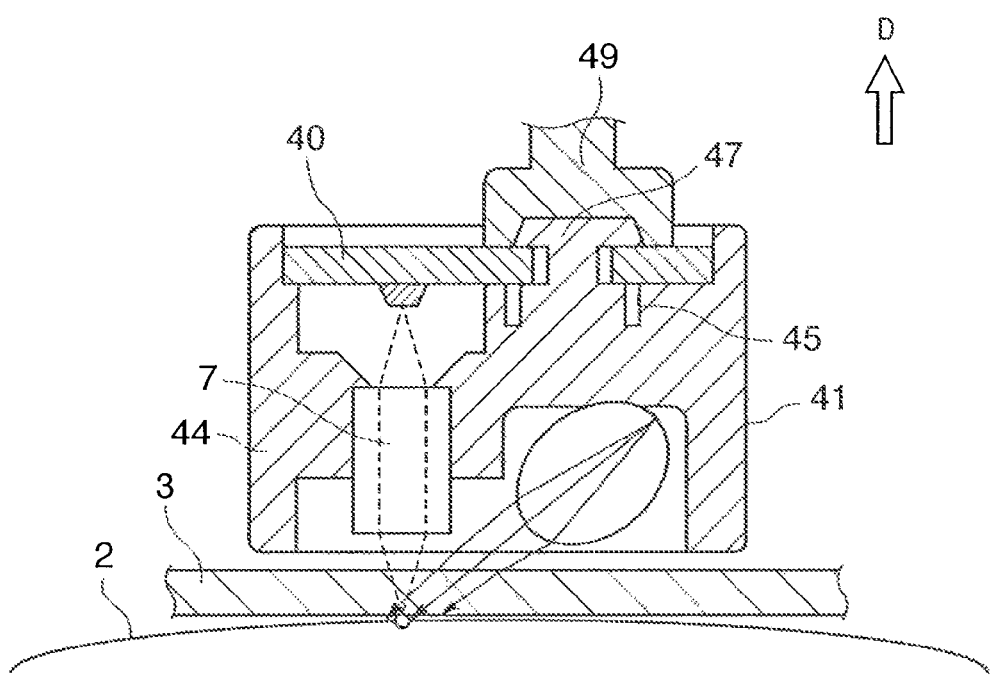
FIG. 7 depicts a sectional view for explaining the thermally caulked combined structure according to the fourth embodiment.

The embodiments will be explained by taking, as an example, a thermally caulked combined structure obtained by fixing a substrate as an object to be fixed by thermal caulking to a molded product made of a thermoplastic resin in a contact image sensor (CIS) unit. FIGS. 2, 4, and 7 to be described later illustrate, as a thermally caulked combined structure according to the embodiments, an example in which a substrate which has a power supply unit and signal input/output unit and on which a linear photoelectric conversion element 108 is accurately mounted is accurately positioned and thermally caulked to a molded product by a thermal caulking method.

Molded products 4 and 44 according to the embodiments are formed by injection-molding fiber reinforced plastic (a polycarbonate resin GN type manufactured by TEIJIN CHEMICALS) obtained by adding 30 wt % of glass fibers to a thermoplastic polycarbonate resin and blackening the resin. Each molded product having an almost rectangular parallelepiped outer shape has a maximum length of about 245 mm in the longitudinal direction, and the outer dimensions of its section are about 10 mm in the vertical direction and about 17 mm in the horizontal direction, that is, the section is almost rectangular. In addition, caulking projections 12, 32, and 42 (FIGS. 1A, 3A, 5A, and 6) for fixing substrates 10 and 40 as objects to be fixed by thermal caulking are made of the same material as the molded products, and formed on the surfaces of the molded products. Also, antiwarping grooves 15, 25, and 35 (FIGS. 1A, 3A, and 5A) are formed on the surfaces of the molded products apart from proximal portions 16, 36, and 46 of these caulking projections. Note that the materials, dimensions, and the like described above are merely examples of the embodiments, so the present invention is not limited to these resins and dimensions.

The substrate 10 or 40 as an object to be fixed is a printed circuit board about 1.0 mm thick made of a glass epoxy resin, and has a length of about 240 mm and a width of about 10 mm. The material and dimensions of this object (substrate) to be fixed are merely examples and hence do not limit the present invention.

Furthermore, thermally caulked combined structures 11, 21, 31, and 41 according to the embodiments each have, inside the molded product, a linear light source 5 that illuminates an original surface, a lens array 7 that forms an image of the reflected light from the original surface on a photoelectric conversion element 8, and the like, in addition to the substrate, so as to function as a CIS unit. Note that the photoelectric conversion element 8 converts the optical image formed by the lens array 7 into an electrical signal. An image reading apparatus according to the embodiments is formed by incorporating the CIS unit thus constructed in an image reading apparatus 1101 shown in FIG. 8.

Figure 8:
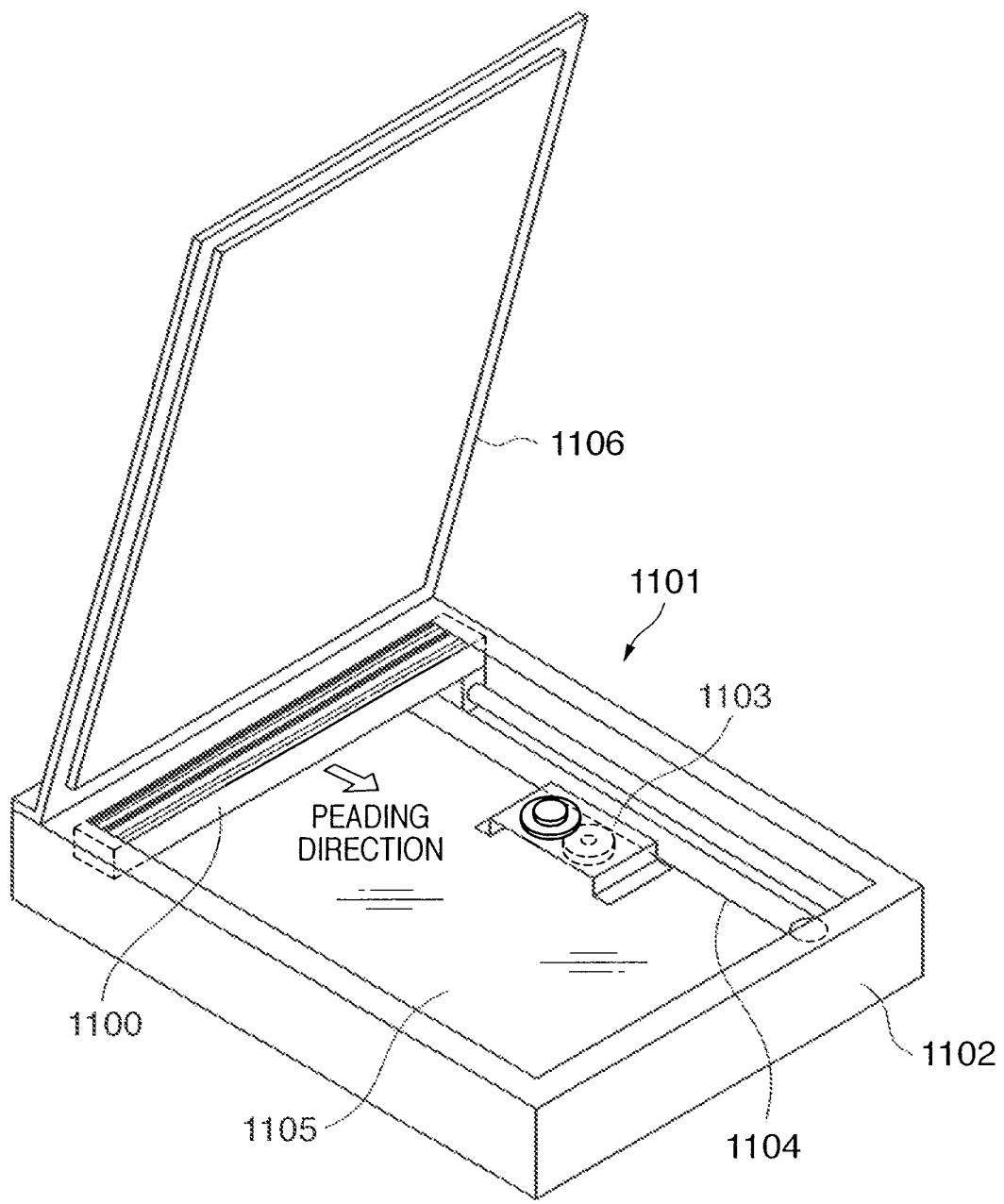
FIG. 8 depicts a view showing the outer appearance of an image reading apparatus according to the embodiment.

FIG. 8 depicts a view showing the outer appearance of the image reading apparatus according to the embodiments.

The image reading apparatus 1101 is a flat bed type image scanner incorporating the CIS unit according to the embodiments described above. The image reading apparatus 1101 has a CIS unit 1100 to be described later inside a housing 1102. The housing 1102 further contains a driving motor 1103 and wire 1104 for moving the CIS unit 1100. A glass plate 1105 is attached as an original support member to the upper surface of the housing 1102. A pressing plate 1106 for pressing an original is attached to an end portion of the housing 1102 so as to be openable and closable. Note that the incorporated CIS unit is turned upside down from those shown in FIGS. 2, 4, and 7; a transparent glass plate 3 faces up, and the substrate 10 or 40 faces down.

In the image reading apparatus 1101 constructed as above, an original is placed with its surface facing down on the glass plate 1105, and the pressing plate 1106 is closed. After that, the driving motor 1103 is rotated to mechanically move the wire 1104, thereby moving the CIS unit 1100 in the reading direction (scanning direction), and reading an image of the original.

The image reading apparatus according to the embodiments is not limited to an image scanner as described above, that is, the scope of the image reading apparatus of the present invention also includes a copying machine or facsimile apparatus incorporating the CIS unit according to the embodiments.

The embodiments of the present invention will be explained in detail below. The same reference numerals denote the same parts in the drawings. Also, the direction of the arrow D shown in each drawing is defined as "upward".

[First Embodiment]

The first embodiment of the present invention will be explained in detail below.

FIGS. 1A and 1B depict views for explaining the way a substrate is fixed to a molded product by thermal caulking according to the first embodiment.

As shown in FIG. 1A, a substrate 10 is incorporated into a molded product 4 made of a thermoplastic resin. The substrate 10 is thermally caulked to the molded product 4 by a plurality of caulking projections 12 projecting from the upper portion of the molded product 4. A frame 14 of the molded product 4 surrounds the end portions of the substrate 10, and the substrate 10 is caulked integrally with the molded product 4 to form a thermally caulked combined structure 11 (FIG. 1B). The frame 14 indicates a portion of the molded product 4, and accommodates the substrate 10 as an object to be fixed by surrounding all the end faces of the substrate 10. In addition, the caulking projections 12 are linearly formed on the two sides in the widthwise direction of an upper surface 13 of the frame 14 of the molded product 4. Also, an antiwarping groove 15 is formed in the surface 13 of the frame 14 apart by about 1.5 mm from a proximal portion 16 of each caulking projection 12.

In the first embodiment, the antiwarping groove 15 having a groove width of 1 mm and a depth of 3 mm is formed in the frame 14 having a thickness of 1.5 mm apart from the proximal portion (root) 16 of each caulking projection 12.

FIG. 1A shows the state (before thermal caulking) in which the substrate 10 is fitted in the frame 14. FIG. 1B shows the state in which the substrate 10 is fixed to the frame 14 by thermal caulking. In FIG. 1B, reference numeral 17 denotes the shape of the caulking projection 12 after thermal caulking. The upper surface of the projection 17 after thermal caulking is almost leveled with the surface 13 of the frame 14.

FIG. 2 depicts a view for explaining the structure of the CIS unit according to the first embodiment by its section. FIG. 2 shows a sectional shape taken along a line W-W in FIG. 1B. Note that the same reference numerals as in FIGS. 1A and 1B denote the same parts in FIG. 2, and a repetitive explanation will be omitted.

The CIS unit reads an image of an original 2 placed below the transparent glass substrate 3. This CIS unit has, inside the molded product 4, a linear light source 5 that illuminates the surface of the original 2, and a lens array 7 that forms an image of the reflected light from the original surface on a linear photoelectric conversion element 8. The CIS unit further incorporates the photoelectric conversion element 8, a rectangular substrate 10 on which the photoelectric conversion element 8 is mounted, and the like.

In this CIS unit, a read line 9 on the original 2 illuminated by the light source 5, the lens array 7, and the photoelectric conversion element 8 are accurately positioned on the same optical axis. Also, the optical distances between these components are determined, and their positions and distances are accurately maintained.

Referring to FIG. 2, a thermal caulking jig 19 heats and presses each pair of caulking projections 12 opposing each other. As indicated by the thermally caulked caulking projection 17, caulking was performed until the caulking projection 12 was almost leveled with the upper surface 13 of the frame 14. As shown in FIG. 1A, the first embodiment has six pairs of caulking projections 12. Accordingly, six thermal caulking jigs 19 are simultaneously operated to fix the substrate 10 to the molded product 4 by a total of twelve caulking projections 12. This thermal caulking was performed for 15 sec under the conditions that the temperature of the thermal caulking jig 19 was held at 190° C., and the air pressure of a pressurizing cylinder for pressing the thermal caulking jig 19 was set at 0.2 MPa.

Figure 9B:
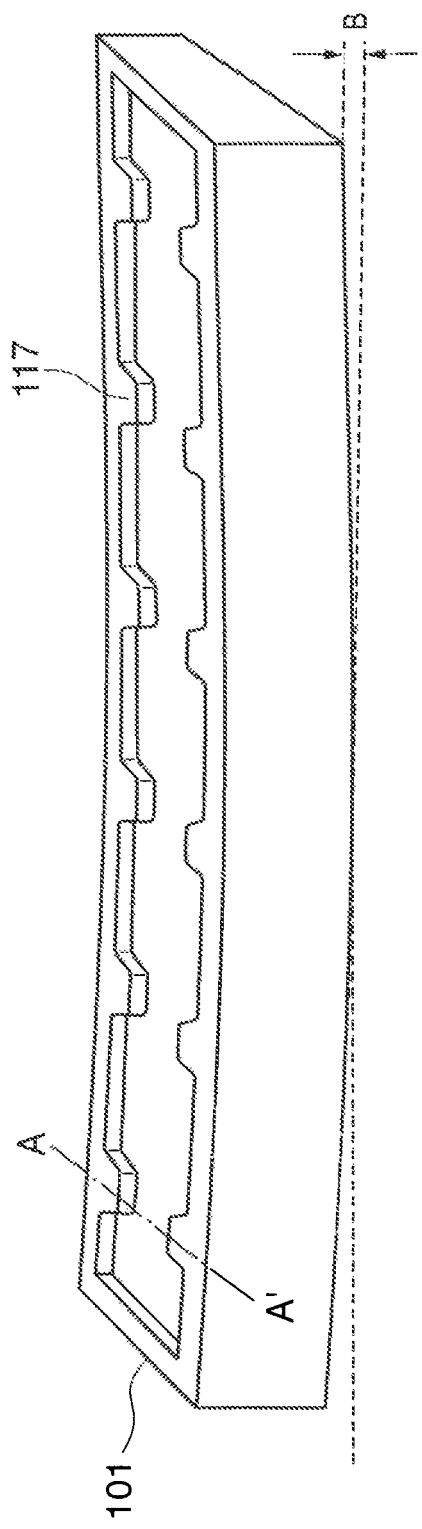
Figure 10:
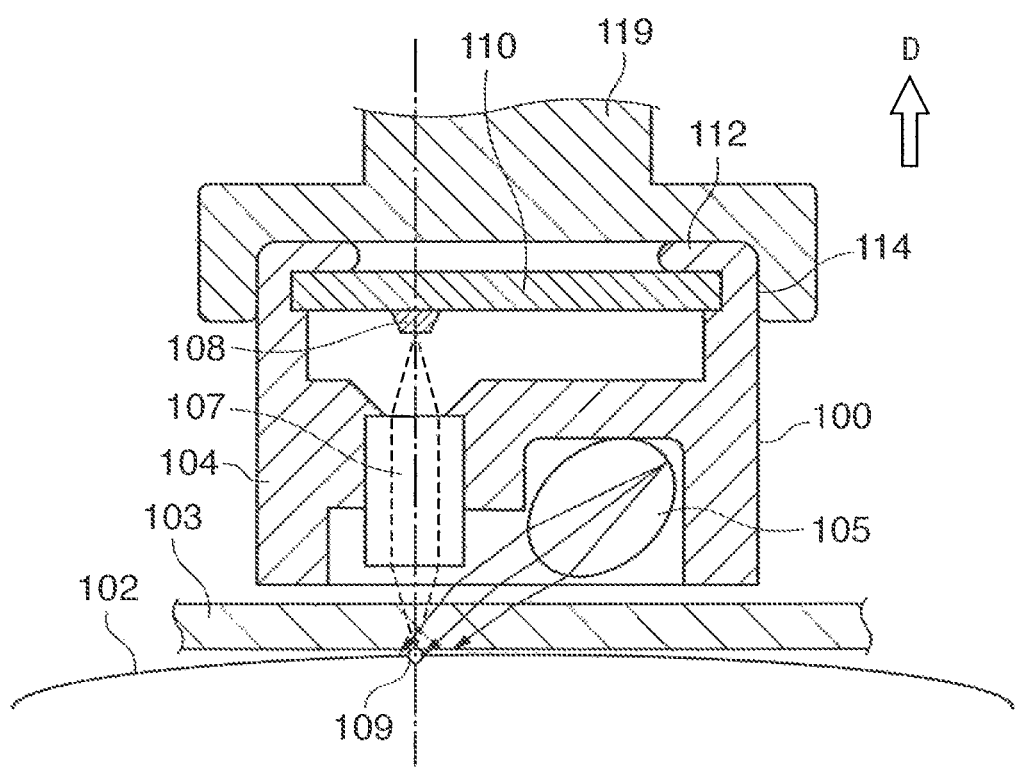
FIG. 10 depicts a view for explaining the structure of a conventional CIS unit by its section.

After that, the thermally caulked combined structure 11 was well cooled, and the amount of warping of the thermally caulked combined structure 11 was measured as a dimension indicated by B in FIG. 9B. Table 1 below also shows, as Comparative Example 1, the amount of warping of a conventional thermally caulked combined structure having no antiwarping grooves in the molded product 4 shown in FIG. 9B.

TABLE 1

| | Measurement No. | Caulking temperature [° C.] | Pressure [Mpa] | Pressing time period [sec] | B Value [μm] Before caulking | B Value [μm] After caulking | Amount of Warping [μm] |
|---|---|---|---|---|---|---|---|
| First Embodiment | 1 | 190 | 0.2 | 15 | −7 | 10 | 17 |
| | 2 | ↑ | ↑ | ↑ | 8 | 25 | 17 |
| | 3 | ↑ | ↑ | ↑ | 6 | 26 | 20 |
| | 4 | ↑ | ↑ | ↑ | 4 | 14 | 10 |
| | 5 | ↑ | ↑ | ↑ | −10 | 10 | 20 |
| | Average | 190 | 0.2 | 15 | 0 | 17 | 17 |
| Comparative Example 1 | 1 | 190 | 0.2 | 15 | 6 | 101 | 95 |
| | 2 | ↑ | ↑ | ↑ | 7 | 110 | 103 |
| | 3 | ↑ | ↑ | ↑ | 0 | 111 | 111 |
| | 4 | ↑ | ↑ | ↑ | −6 | 91 | 97 |
| | 5 | ↑ | ↑ | ↑ | −1 | 91 | 92 |
| | Average | 190 | 0.2 | 15 | 1 | 101 | 100 |
| Second Embodiment | 1 | 190 | 0.2 | 15 | −2 | 31 | 33 |
| | 2 | ↑ | ↑ | ↑ | 3 | 32 | 29 |
| | 3 | ↑ | ↑ | ↑ | 5 | 33 | 28 |
| | 4 | ↑ | ↑ | ↑ | −1 | 33 | 34 |
| | 5 | | ↑ | ↑ | 0 | 31 | 31 |
| | Average | 190 | 0.2 | 15 | 1 | 32 | 31 |

As shown in Table 1, the average amount of warping of the thermally caulked combined structure 11 according to the first embodiment was 17 μm. By contrast, the average amount of warping of the conventional thermally caulked combined structure as Comparative Example 1 was 100 μm, indicating that the amount of warping is reduced.

In addition to the comparison of the amounts of warping, the CIS unit according to the first embodiment was incorporated into the image reading apparatus 1101 shown in FIG. 8 to read an original for resolution determination, and the read data was output to a connected printer and printed out. When the printed image was examined, the differences in quality such as the image distortion and resolution between the central portion and two end portions in the longitudinal direction of the CIS unit were negligibly small, indicating that a favorable image reading apparatus can be manufactured.

Also, as described previously, the substrate 10 is fixed by thermal caulking by deforming the caulking projections 12 until they are almost leveled with the upper surface 13 of the frame 14, so the thermal caulking process produces almost no surface roughness on the upper surface 13 of the frame 14. This surface roughness is desirably ±40 μm or less from the upper surface 13. The CIS unit obtained by the thermal caulking method according to the first embodiment as described above can be easily incorporated into an image reading apparatus with high positional accuracy.

Figure 11:
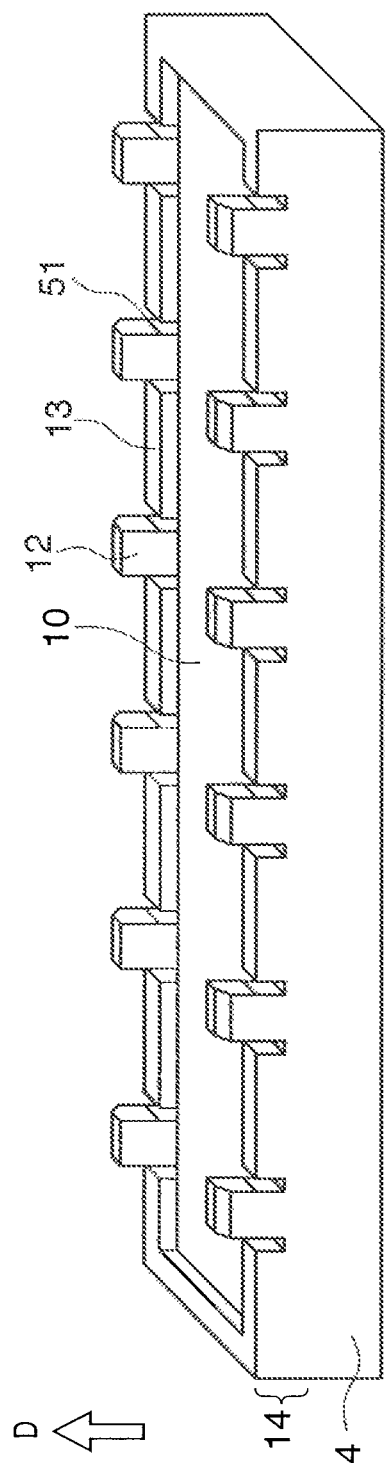
FIG. 11 depicts a view showing a comparative example in which antiwarping grooves are formed at the proximal portions of caulking projections in a molded product having the same frame as used in the first embodiment.

FIG. 11 depicts a view showing, as a comparative example, the case that antiwarping grooves 51 are formed at the proximal portions of caulking projections 12 in a molded product 4 having the same frame 14 as used in the first embodiment. Note that the same reference numerals as in FIGS. 1A and 1B denote the same parts in FIG. 11, and a repetitive explanation will be omitted.

In this comparative example, a substrate 10 was accommodated in the molded product 4 and thermally caulked in the same manner as in the first embodiment. In this case, portions corresponding to the proximal portions of the caulking projections 12 deformed, and there was the possibility that this deformation crushed the antiwarping grooves 51. Also, the amount of warping measurement values varied more largely than in the first embodiment. From the foregoing, when the antiwarping grooves were formed along the proximal portions of the caulking projections 12, no warping preventing effect was obtained, and the shape accuracy of the molded product decreased, compared to the first embodiment.

[Second Embodiment]

FIG. 4 depicts a view for explaining the structure of a CIS unit 2 according to the second embodiment by its section. Note that the same reference numerals as in FIGS. 1A and 1B denote the same parts in FIG. 4, and a repetitive explanation will be omitted.

Figure 3A:
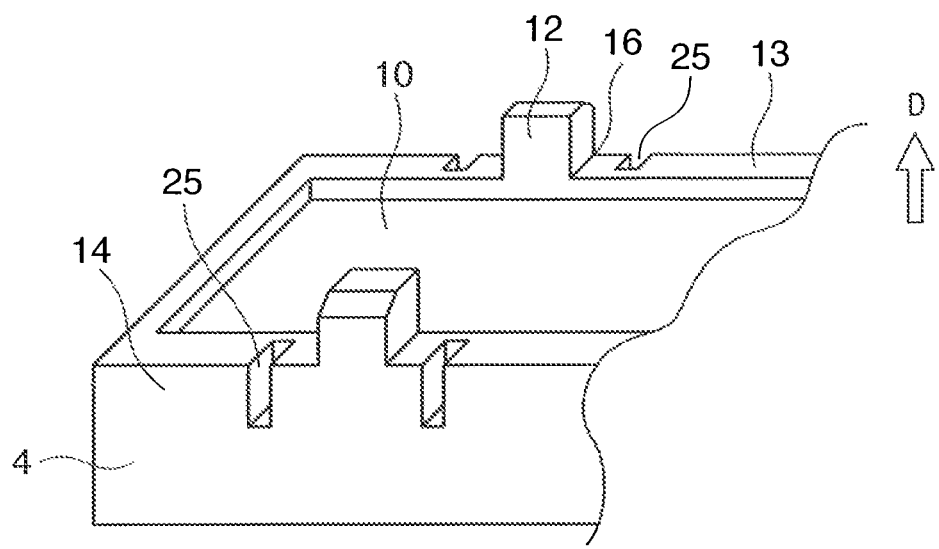
FIGS. 3A and 3B depict enlarged views of main parts showing the state in which a substrate is fixed to a molded product by thermal caulking according to a second embodiment.
Figure 3B:
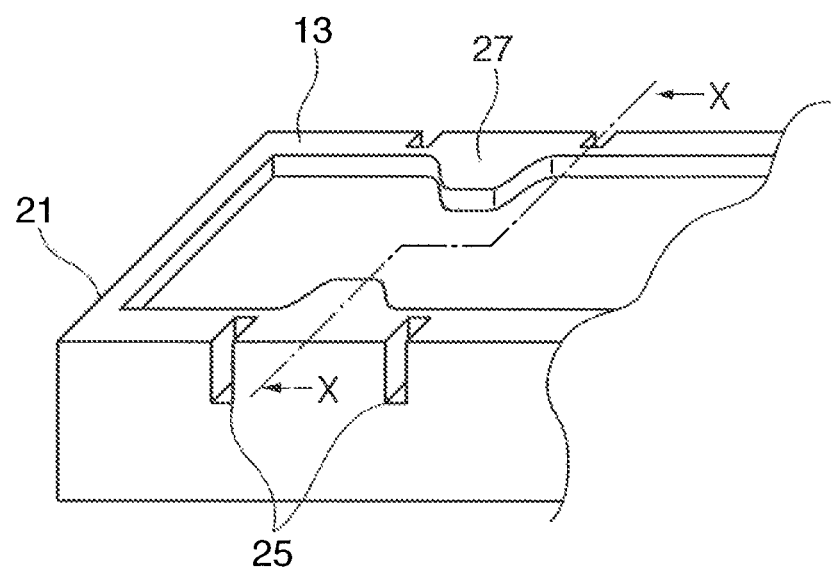

FIGS. 3A and 3B depict enlarged views of main parts showing the state in which a substrate is fixed to a molded product by thermal caulking according to the second embodiment. FIG. 4 shows a sectional shape taken along a line X-X in FIG. 3B.

In the second embodiment, antiwarping grooves 25 are formed in the surface of a frame 14 apart from a proximal portion 16 of a caulking projection 12. As shown in the drawings, the groove 25 is formed so that an inside portion of the wall of the frame 14 slightly remains. That is, the antiwarping groove 25 was formed by 3 mm downward from an upper surface 13 so that an inside portion about 0.15 mm thick of the frame 14 having a thickness of 1.5 mm remained. Thermal caulking was performed by using the same thermal caulking jigs under the same conditions as in the first embodiment, thereby deforming an upper portion 27 (FIG. 3B) of the thermally caulked caulking projection 12 until the upper portion 27 was almost leveled with the upper surface 13 of the frame 14. After a thermally caulked combined structure 21 was well cooled, a dimension corresponding to B in FIG. 9B was measured. The results are shown as measurement examples of the second embodiment in Table 1 above.

As is apparent from Table 1, the average amount of warping of the thermally caulked combined structure 21 according to the second embodiment was 31 μm that was slightly larger than the average amount of warping of the first embodiment described above. This is so presumably because the antiwarping groove 25 was formed by slightly leaving the wall of the frame 14 behind.

In addition to the comparison of the amounts of warping, the CIS unit according to the second embodiment was incorporated into the image reading apparatus 1101 shown in FIG. 8, and images read by the image reading apparatus 1101 were printed out and compared following the same procedure as in the first embodiment.

Consequently, the differences in quality such as the image distortion and resolution between those portions of the read images which corresponded to the central portion and two end portions of the CIS unit were negligibly small, indicating that an image reading apparatus using a favorable CIS unit can be manufactured.

Also, the shape of the caulking projection 12 is fixed by thermal caulking by deforming the caulking projection 12 until it is almost leveled with the upper surface 13 of the frame. This produces no unnecessary surface roughness by the caulking process on the upper surface 13 of the frame 14. Accordingly, the CIS unit can be easily incorporated into an image reading apparatus with high positional accuracy as in the first embodiment.

Note that the antiwarping groove 25 according to the second embodiment is formed to leave the inside portion of the frame 14 behind. This makes it possible to secure the internal optical path of a molded product 4, and prevent external light from entering an inner space 18 (FIG. 4) of the molded product 4 which accommodates a substrate 10 and parts mounted on it. Therefore, it was possible to manufacture a better CIS unit. The substrate 10 is preferably coated with a black thermosetting solder resist (e.g., SSR-671 manufactured by SAN-EI KAGAKU) having high light-shielding properties.

[Third Embodiment]

The third embodiment of the present invention will be explained below.

FIGS. 5A and 5B depict views for explaining the state in which a substrate 10 is fixed to a molded product 34 by thermal caulking according to the third embodiment.

The molded product 34 according to the third embodiment does not have the frame 14 shown in FIG. 1. As shown in FIG. 5A, a plurality of caulking projections 32 almost linearly project from the two sides in the widthwise direction of the surface of the molded product 34 with which the lower surface of the substrate 10 as an object to be fixed comes in contact.

In the first or second embodiment described above, the frame 14 surrounding the end faces of the substrate 10 has a function of fixing the substrate 10 so as not to cause any positional shift or damage when the CIS unit is in the distribution stage or after the CIS unit is attached to a scanner or the like. However, the scope of the present invention also includes a thermally caulked combined structure 31 using the molded product 34 having no frame 14 if this function is replaced by another.

The length from the proximal portion to the distal end of the caulking projection 32 according to the third embodiment is larger by the height of the frame 14 than the projection 12 of the first embodiment. Also, antiwarping grooves 35 are formed in an upper surface 33 apart by about 1.5 mm from proximal portions 36 on the two sides of the caulking projection 32 (FIG. 5A). That is, the groove 35 is formed across a thickness of about 3 mm between the outer side surface and an inner space 18 of the molded product 34, and has a depth of about 1.5 mm downward. The substrate 10 was placed between the two, almost linear rows of the caulking projections 32 formed on the two sides in the widthwise direction, and caulked under the same caulking conditions as in the first embodiment described above by using the thermal caulking jigs 19 of the first embodiment. FIG. 5B shows the obtained state. In this manner, the thermally caulked combined structure 31 to which the substrate 10 was fixed was manufactured.

After the thermally caulked combined structure 31 was well cooled, the amount of warping indicated by B in FIG. 9B was measured. As a consequence, the average amount of warping was about 15 µm.

As a comparative example of the third embodiment, a molded product 34 having no antiwarping grooves 35 and a substrate 10 were thermally caulked under the same conditions as in the third embodiment. The average amount of warping measured after the thermally caulked combined structure was well cooled was about 58 µm.

The above results indicate that an average amount of warping of 15 µm of the thermally caulked combined structure 31 according to the third embodiment was largely reduced from that of the comparative example. With this amount of warping, when an image is read by an image reading apparatus incorporating a CIS unit including the thermally caulked combined structure 31 according to the third embodiment, the quality difference between output images corresponding to the central portion and two end portions in the longitudinal direction of the CIS unit is negligibly small. This demonstrates that an image reading apparatus using a favorable CIS unit can be manufactured.

In the third embodiment, the length of the caulking projection 32 is larger than those of the projections according to the first and second embodiments described above. This suppresses conduction of heat from the thermal caulking jig 19 to the molded product 34. Consequently, the depth of the antiwarping grooves 35 formed to prevent warping can be set smaller than those in the first and second embodiments

[Fourth Embodiment]

The fourth embodiment of the present invention will be explained below.

FIG. 6 depicts a view for explaining a thermally caulked combined structure 41 according to the fourth embodiment.

A molded product 44 according to the fourth embodiment has a frame 48 surrounding the end faces of a substrate 40. Also, the thermally caulked combined structure 41 has six caulking holes 50 linearly arranged in the longitudinal direction in an almost central portion in the widthwise direction of the substrate 40 as an object to be fixed. In one-to-one correspondence with the caulking holes 50, six columnar caulking projections 42 are formed on the surface of the molded product 44 with which the lower surface of the substrate 40 comes in contact. The thermally caulked combined structure 41 is manufactured by allowing the caulking projections 42 to protrude from the caulking holes 50, and performing thermal caulking in this state. Reference numeral 43 denotes the upper surface of the molded product 44.

In the fourth embodiment, as shown in FIG. 6, ring-like antiwarping grooves 45 are formed in the surface of the molded product 44 before caulking, so as to surround proximal portions 46 of the caulking projections 42 in positions apart from the proximal portions 46. In this manner, the thermally caulked combined structure 41 was manufactured by fixing the substrate 40 by thermal caulking with the caulking projections 42 protruding from the caulking holes 50.

In the molded product 44 according to the third embodiment, the diameter of the proximal portion 46 of the columnar caulking projection 42 is 2.0 mm. The ring-like antiwarping groove 45 having an inner diameter of 3.0 mm, a width of 0.8 mm, and a depth of 2.0 mm is formed, with a concentric spacing of 0.5 mm from the proximal portion 46, in the surface of the molded product 44 with which the lower surface of the substrate 40 comes in contact.

The six caulking projections 42 are almost linearly arranged at almost equal intervals along the longitudinal direction of the molded product 44. The diameter of each of the caulking holes 50 formed in those positions of the substrate 40 which correspond to the caulking projections 42 is 2.2 mm. The substrate 40 is set in contact with the molded product 44 with the caulking projections 42 protruding from the caulking holes 50.

FIG. 7 depicts a sectional view for explaining the thermally caulked combined structure 41 according to the fourth embodiment. FIG. 7 shows a sectional shape taken along a line Y-Y in FIG. 6. Note that the same reference numerals as in the previous drawings denote the same parts in FIG. 7, and a repetitive explanation will be omitted.

Referring to FIG. 7, the thermally caulked combined structure 41 is manufactured by thermal caulking by using thermal caulking jigs 49. Note that in the fourth embodiment, the caulking holes 50 are almost linearly arranged along the longitudinal direction in an almost central portion in the widthwise direction of the substrate 40. Consequently, the width of the substrate 40 is about 15 mm, and the width of the molded product 44 is about 20 nm, i.e., the width of the substrate 40 is larger than those in the first to third embodiments described previously.

Thermal caulking according to the fourth embodiment is performed for 15 sec by setting the temperature of the thermal caulking jigs 49 at 190° C., and the pressure at 0.2 MPa. As indicated by reference numeral 47 in FIGS. 6 and 7, the caulking projection 42 was deformed by thermal caulking until it was almost leveled with the upper surface 43 of the frame 48. After that, the thermally caulked combined structure 41 was well cooled, and an amount of warping B of the thermally caulked combined structure 41 was measured in the same manner as in the first embodiment. As a consequence, the average amount of warping was about 24 μm.

As a comparative example of the fourth embodiment, a molded product 44 having no antiwarping grooves 45 and a substrate 40 were thermally caulked under the same conditions as in the fourth embodiment, and the amount of warping was measured after the obtained structure was well cooled. As a result, the average amount of warping was about 52 μm.

The above results demonstrate that an average warping amount of 24 μm of the thermally caulked combined structure 41 according to the fourth embodiment is much smaller than an amount of warping of 52 μm of the comparative example.

With this warping amount, when an image reading apparatus incorporating the thermally caulked combined structure 41 according to the fourth embodiment is used, the quality difference between images corresponding to the central portion and two end portions in the longitudinal direction of the CIS unit can be made negligibly small. In this manner, an image reading apparatus using a preferable CIS unit can be manufactured.

Also, in the fourth embodiment, the shape of the caulking projection 42 is fixed by thermal caulking by deforming the upper surface of the caulking projection 42 until it is almost leveled with the upper surface 43 of the frame 48. Therefore, the thermal caulking process produces no unwanted surface roughness on the upper surface 43 of the frame 48. Accordingly, the CIS unit obtained by the thermal caulking method according to the fourth embodiment can be incorporated into an image reading apparatus as in the previous embodiments.

In the first to fourth embodiments described above, the positions and the dimensions such as the depths of the antiwarping grooves are desirably optimized from confirmation by several tests by taking account of, for example, the effect of shielding heat conducted from the caulking projections during thermal caulking and the caulking strength.

Table 2 shows the relationship between the heating temperature and the heat shrinkage ratio after cooling of the glass fiber reinforced polycarbonate used in the embodiments.

Table 2 shows that the shrinkage ratio abruptly increases when the heating temperature is 140° C. or more. In the above embodiments, therefore, heat shrinkage of the molded product desirably occurs in only the region sandwiched between the antiwarping grooves. In addition, the shape and dimensions of the antiwarping groove and the thermal caulking conditions are desirably determined such that the molded product outside the region sandwiched between the antiwarping grooves is not heated to 140° C. or more during thermal caulking. To satisfy the findings shown in Table 2 and prevent groove crush explained in the comparative example shown in FIG. 11, the antiwarping groove according to the embodiment is formed apart from the proximal portion of the caulking projection (the first countermeasure).

It is also desirable to check the flowing direction of the resin and the orientation of the glass fibers during injection molding of the polycarbonate molded product. It is of course also necessary to confirm that the strength of fixing by thermal caulking is sufficient.

Furthermore, the second countermeasure by which the antiwarping groove 25 is formed apart from the proximal portion of the caulking projection 12 will be explained below with reference to FIG. 12.

Figure 12:
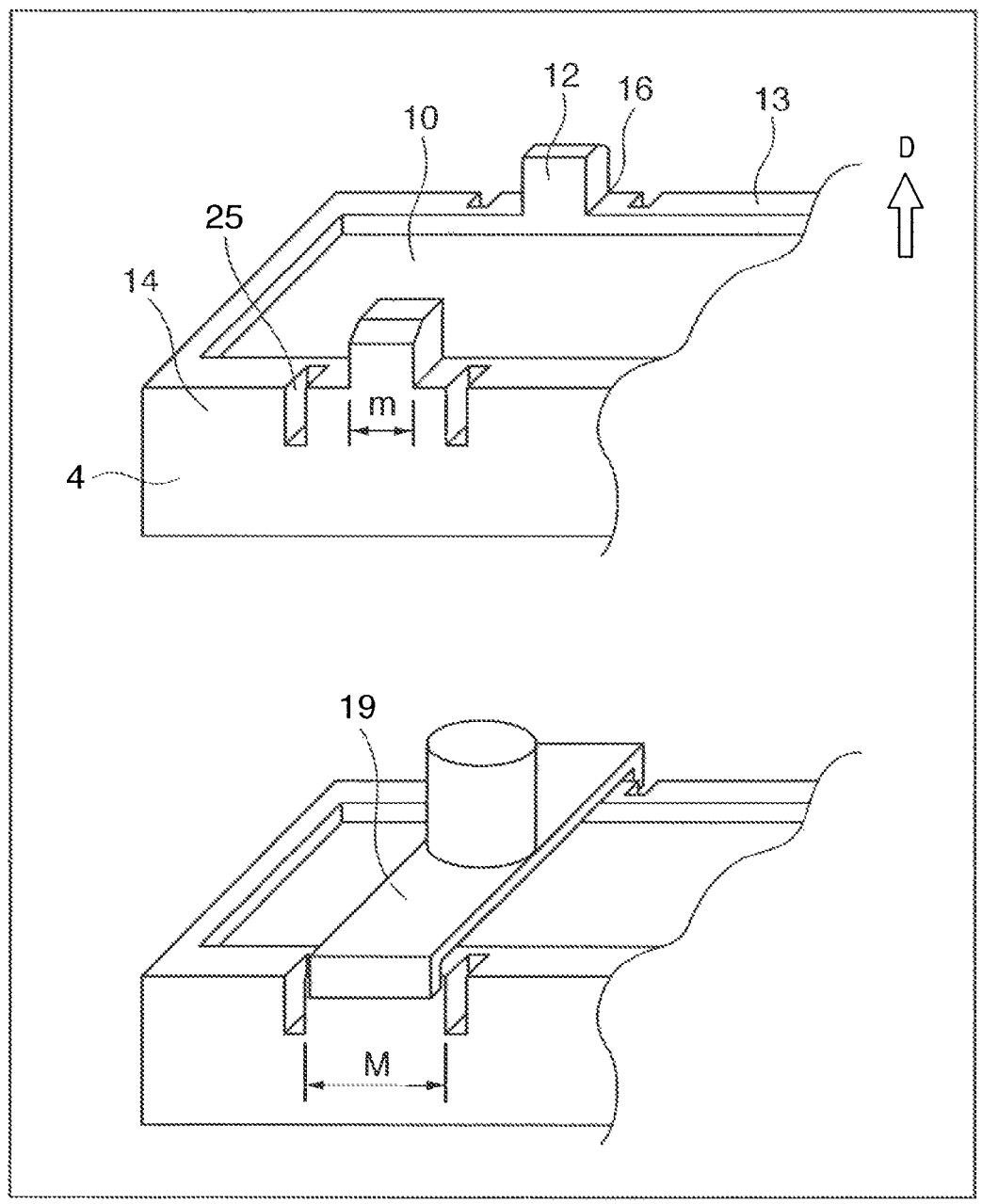
FIG. 12 depicts a view showing the state in which a thermal caulking jig heats and presses each pair of caulking projections opposing each other in the second embodiment of the present invention.

FIG. 12 shows the state in which the thermal caulking jig 19 heats and presses each pair of the caulking projections 12 opposing each other in the second embodiment of the present invention.

As shown in FIG. 12, a width M of the thermal caulking jig 19 is larger than a width m of the caulking projection 12, and slightly smaller than the distance between the grooves 25 making a pair. The width of the thermal caulking jig 19 is made larger than that of the caulking projection 12 from the viewpoints of manufacture, that is, in order to facilitate alignment of the caulking projection 12 and thermal caulking jig 19, and accommodate the whole deformation of the caulking projection 12 caused by caulking within the width of the thermal caulking jig 19. Furthermore, the width of the thermal caulking jig 19 is made smaller than the distance between the paired grooves 25 in order to prevent heat from the thermal caulking jig 19 from being conducted to the molded product outside the region sandwiched between the antiwarping grooves 25. That is, the second countermeasure determines the position of the antiwarping groove 25 based on the relationship between the shape of the caulking projection 12 and the thermal caulking jig 19 used for caulking.

As described above, the antiwarping groove 25 is formed apart from the proximal portion of each caulking projection 12 based on the first and second countermeasures. The first to third embodiments described previously are embodiments of the present invention in which both the first and second countermeasures are performed, and the fourth embodiment is an embodiment of the present invention in which the first countermeasure is dominant.

The antiwarping grooves based on these examinations were formed in the molded product, and thermal caulking was performed after that. Consequently, it was possible to obtain a favorable warping preventing effect in the thermally caulked combined structure including the almost rectangular parallelepiped molded product on which the caulking projections were almost linearly arranged. It was also possible to further reduce the amount of warping by fixing the two ends in the longitudinal direction of the thermally caulked combined structure during the period from the start of thermal caulking to the end of cooling.

TABLE 2

Heat shrinkage ratio of glass fiber reinforced carbonate

| Heating temperature | Shrinkage ratio |
|---|---|
| 100° C. | 0.02% |
| 120° C. | 0.03% |
| 140° C. | 0.32% |
| 160° C. | 0.52% |
| 180° C. | Immeasurable by melt deformation |

Note that the antiwarping grooves according to the embodiments explained above are formed to reduce heat conduction from the caulking projection to the portion outside the region sandwiched between the antiwarping grooves, thereby preventing warping in this outside portion caused by heat shrinkage of the molded product.

By contrast, each of Japanese Patent Laid-Open No. 2005-31487 (e.g., FIG. 7) and Japanese Patent Laid-Open No. 2007-1116 (e.g., FIGS. 1 and 20) discloses a structure in which grooves are formed in contact with the proximal portion of a caulking projection. The invention described in each reference relates to a technique that connects projections and an object to be fixed by applying ultrasonic vibrations to the projections.

Japanese Patent Laid-Open No. 2005-31487 discloses a welding groove into which an excess molten welding rib flows during ultrasonic welding upon forming the frame of a process cartridge. This patent reference discloses a groove shape that alleviates stress concentration by ultrasonic vibrations. FIG. 7 of this reference shows a plurality of groove shapes in each of which a welding groove is formed apart from the proximal portion of the welding rib.

In Japanese Patent Laid-Open No. 2007-1116, a groove is called a thermal stress escape groove, and a projection extends through a hole formed in an object to be fixed. That is, Japanese Patent Laid-Open No. 2007-1116 discloses the thermal stress escape groove that, when connecting the projection and object to be fixed by ultrasonic vibrations, prevents melting of the proximal portion of the projection or a decrease in strength caused by the temperature rise resulting from friction of vibration when the edge of the hole in the object to be fixed and the proximal portion of the projection abut against each other.

These conventional techniques, however, are the groove for receiving the molten fluid resin, and the groove for alleviating the stress concentration during welding, so these conventional grooves are inevitably different in position, shape, and size from the above-mentioned embodiments. Also, the technical problems solved by these conventional grooves and their effects are naturally different from those of the embodiments.

As the thermoplastic resin according to the embodiments, it is also possible to use, for example, a polystyrene resin, ABS resin, vinyl chloride resin, acrylic resin, polyphenylene oxide modified resin, polysulfone resin, polyethersulfone resin, or modified polyphenylene ether resin, as an amorphous thermoplastic resin, instead of the polycarbonate resin described above. Examples of a highly crystalline thermoplastic resin are a polyethylene resin, polypropyrene resin, ethylene tetrafluoride resin, polyacetal resin, polyimide resin, polyethylene terephthalate resin, polybutylene terephthalate resin, and polyphenylenesulfide resin. Accordingly, the scope of the present invention also includes thermally caulked combined structures using molded products made of these resins.

Even when using a molded product made of any of these resins, it is desirable to check, for example, the relationship between the heating temperature and heat shrinkage, the flowing direction of the resin during molding, and the orientation direction of fibers or a filler filled to reinforce the resin characteristics, thereby designing an antiwarping groove that reduces the amount of warping caused by heat shrinkage during thermal caulking.

The antiwarping grooves thus designed are formed near caulking projections on the surface of a molded product and apart from the proximal portions of these projections. A thermally caulked combined structure having a small amount of warping can be manufactured by fixing an object to be fixed by thermal caulking by heating and pressing the caulking projections.

As has been explained above, the embodiments make it possible to manufacture a thermally caulked combined structure having high dimensional accuracy by forming antiwarping grooves apart from the proximal portions of caulking projections.

In addition, when this thermally caulked combined structure incorporating a linear light source, lens array, photoelectric conversion element, and the like is used, it is possible to provide an image sensor unit that has a small amount of deformation caused by warping and is readily incorporated into another apparatus, and provide an image reading apparatus using the image sensor unit.

The invention claimed is:

1. A method of manufacturing a molded product of an image sensor unit comprising a molded product having a substantially rectangular parallelepiped outer shape and incorporating a substrate on which photoelectric conversion elements are arranged in line, wherein the photoelectric conversion elements convert an image focused of a reflected light from an original by a lens array into an electric signal, the method comprising the steps of:

forming a frame on the molded product to surround a periphery of the substrate;

forming a plurality of caulking projections configured to be bent in order to fix the substrate to the frame, the plurality of caulking projections being formed in a substantially linear arrangement on an upper surface of the frame in a longitudinal direction, each caulking projection having (i) proximal portions on the frame and (ii) being arranged at a predetermined interval from each other;

forming a plurality of antiwarping grooves on the upper surface of the frame, the plurality of antiwarping grooves configured to prevent warping of the frame upon bending the caulking projections, each antiwarping groove being proximate to one of the caulking projections but arranged apart from the respective proximal portion of each caulking projection;

fitting the substrate to be fixed in the frame of the molded product; and bending the caulking projections by heat and pressure to fix the substrate in the frame.

2. The manufacturing method according to claim 1, wherein a position of each antiwarping groove is determined based on the relationship between a shape of the caulking projection and a thermal caulking jig used for bending of the caulking projections.

3. The manufacturing method according to claim 2, wherein a width of the thermal caulking jig is larger than a width in a longitudinal direction of the caulking projection and smaller than a distance between antiwarping grooves existing on both sides of the caulking projection, and the thermal caulking jig has a shape for covering a pair of opposed caulking projections.

4. The manufacturing method according to claim 1, wherein the antiwarping grooves are formed from the upper surface to a downside of the frame.

5. The manufacturing method according to claim 1, wherein the bending step bends each of the caulking projections toward an inside of the frame, and an upper surface of the bent caulking projection is almost level with the upper surface of the frame.

6. The manufacturing method according to claim 1, wherein each of the antiwarping grooves is formed so that an inside portion of a wall of the frame remains.

7. The manufacturing method according to claim 1, wherein each of the antiwarping grooves has dimensions for optimizing an effect of shielding heat conducted from the caulking projections during bending by applying heat and pressure.

8. The manufacturing method according to claim 1, wherein the antiwarping grooves remain exposed after the bending step has been performed.

9. The manufacturing method according to claim 1, wherein two antiwarping grooves exist between adjacent caulking projections.

10. The manufacturing method according to claim 4, wherein the frame has a height and the depth of each antiwarping groove is shorter than the height of the frame.

* * * * *